(12) United States Patent
Barrios et al.

(10) Patent No.: US 9,490,041 B2
(45) Date of Patent: Nov. 8, 2016

(54) COMPOSITE PARTICLES COMPRISING A CONDUCTIVE COATING OF PEDOT/PSS, METHODS OF MAKING, AND ARTICLES INCLUDING THE SAME

(71) Applicant: 3M INNOVATIVE PROPERTIES COMPANY, St. Paul, MN (US)

(72) Inventors: Carlos A. Barrios, Woodbury, MN (US); Baris Yalcin, Woodbury, MN (US); Stephen E. Amos, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 145 days.

(21) Appl. No.: 14/386,629

(22) PCT Filed: Mar. 15, 2013

(86) PCT No.: PCT/US2013/031959
§ 371 (c)(1),
(2) Date: Sep. 19, 2014

(87) PCT Pub. No.: WO2013/148307
PCT Pub. Date: Oct. 3, 2013

(65) Prior Publication Data
US 2015/0068637 A1    Mar. 12, 2015

Related U.S. Application Data

(60) Provisional application No. 61/616,099, filed on Mar. 27, 2012.

(51) Int. Cl.
*B32B 5/16*   (2006.01)
*H01B 1/12*   (2006.01)
(Continued)

(52) U.S. Cl.
CPC .................. *H01B 1/127* (2013.01); *B05D 1/18* (2013.01); *C03C 11/002* (2013.01); *C03C 17/32* (2013.01);
(Continued)

(58) Field of Classification Search
CPC ................................................ Y10T 428/2991
USPC ................................................... 428/403, 407
See application file for complete search history.

(56) References Cited

U.S. PATENT DOCUMENTS 3,713,961 A    1/1973   Copeland
5,356,636 A   10/1994   Schneider
(Continued)

FOREIGN PATENT DOCUMENTS

CN    1742056 A    3/2006
CN    1990799      7/2007
(Continued)

OTHER PUBLICATIONS

"Michem® Emulsion 09625", Technical Data Sheet, Michelman, 2012, 1-3 pages.
(Continued)

*Primary Examiner* — Holly Le
(74) *Attorney, Agent, or Firm* — Bradford B. Wright

(57) ABSTRACT

A composite particle includes a spheroidal core having a polymeric layer disposed thereon. In one embodiment, the polymeric layer includes a cationic surfactant and at least one of a nonionic polymer or an anionic polymer. In another embodiment, the polymeric layer includes a cationic polymer and an anionic polymer. Methods of making the composite particles, composite materials, and articles including them are also disclosed.

12 Claims, 14 Drawing Sheets

(51) Int. Cl.

| | |
|---|---|
| *C09C 3/10* | (2006.01) |
| *C09C 1/28* | (2006.01) |
| *C09C 1/30* | (2006.01) |
| *C03C 11/00* | (2006.01) |
| *C03C 17/32* | (2006.01) |
| *B05D 1/18* | (2006.01) |
| *F16L 58/14* | (2006.01) |

(52) U.S. Cl.
CPC ............... *C09C 1/28* (2013.01); *C09C 1/3072* (2013.01); *C09C 3/10* (2013.01); *F16L 58/14* (2013.01); *H01B 1/124* (2013.01); *C01P 2004/03* (2013.01); *C01P 2004/34* (2013.01); *C01P 2004/61* (2013.01); *C01P 2006/10* (2013.01); *C01P 2006/20* (2013.01); *C01P 2006/40* (2013.01); *Y10T 428/2998* (2015.01)

(56) References Cited

U.S. PATENT DOCUMENTS

| | | | | |
|---|---|---|---|---|
| 5,994,418 | A | 11/1999 | Weiser | |
| 2004/0033905 | A1 | 2/2004 | Shinbach | |
| 2005/0034993 | A1* | 2/2005 | Gozdz | H01M 4/13 205/57 |
| 2006/0057457 | A1* | 3/2006 | Bang | H01M 2/06 429/161 |
| 2007/0090542 | A1 | 4/2007 | Condie | |
| 2007/0253989 | A1* | 11/2007 | Abe | A61K 8/11 424/401 |
| 2010/0184911 | A1 | 7/2010 | Polk | |
| 2011/0132440 | A1* | 6/2011 | Sivarajan | B82Y 10/00 136/252 |
| 2011/0171749 | A1* | 7/2011 | Alocilja | B82Y 5/00 436/501 |
| 2012/0183705 | A1* | 7/2012 | Chereau | C08J 3/212 428/17 |

FOREIGN PATENT DOCUMENTS

| | | |
|---|---|---|
| CN | 101036198 A | 9/2007 |
| EP | 0391412 | 10/1990 |
| EP | 1832272 | 9/2007 |
| JP | 2009-170319 | 7/2009 |
| KR | 10-0862973 B1 | 10/2008 |
| WO | WO 92-20465 | 11/1992 |
| WO | WO 01-14273 | 3/2001 |
| WO | WO 02-060681 | 8/2002 |
| WO | WO 2008-033343 | 3/2008 |
| WO | WO 2012-061241 | 5/2012 |
| WO | WO 2012-151178 | 11/2012 |
| WO | WO 2013-096157 | 6/2013 |
| WO | WO 2013-148307 | 10/2013 |

OTHER PUBLICATIONS

"Michem® Emulsion 09730", Technical Data Sheet, Michelman, 2012, 1-3 pages.
"Michem® Emulsion 11226", Technical Data Sheet, Michelman, 2012, 1-3 pages.
"Michem® Emulsion 70350", Technical Data Sheet, Michelman, 2012, 1-3 pages.
3M™ Glass Microsphere Compounding and Injection Molding Guidelines. 2008, 1-8 pages.
Malik, "Anti-corrosion Ability of Surfactants: A Review." Int. J. Electrochem. Sci., 2011, vol. 6, pp. 1927-1948.
Narkis, "Syntactic Foams II. Preparation and Characterization of Three-Phase Systems", Journal of Cellular Plastics, Nov./Dec. 1980, pp. 326-330.
Narkis, "Syntactic Foams III. Three-Phase materials produced from resin coated microballoons", Journal of Cellular Plastics, 1982, vol. 18, No. 4, pp. 230-232, 239.
Rand, "An Aromatic Polyimide Syntactic Foam", Journal of cellular plastics, May-Jun. 1973, pp. 130-133.
Suryanarayana, "Effect of pH of Silane Solution on the Adhesion of Polyimide to a Silica Substrate", Journal of Applied Polymer Science, 1984, vol. 29, pp. 2039-2043.
International Search Report for PCT International Application No. PCT/US2013/031959 mailed on May 31, 2013, 3 pages.

* cited by examiner

COMPOSITE PARTICLES COMPRISING A CONDUCTIVE COATING OF PEDOT/PSS, METHODS OF MAKING, AND ARTICLES INCLUDING THE SAME

FIELD

The present disclosure broadly relates to fillers and compositions including them.

BACKGROUND

The use of round inorganic bodies such as glass beads, ceramic beads, hollow glass microbubbles, or hollow ceramic microspheres as fillers in organic compositions containing polymers is widespread. Reasons for incorporating such fillers may include weight savings and/or improved mechanical properties. However, clumping of these inorganic bodies during attempts to disperse them in an organic binder material has plagued industry for decades. Clumping can result in non-uniformities that may be aesthetically displeasing and/or functionally inferior, as compared to a uniform dispersion of the inorganic bodies in the binder material.

SUMMARY

The present inventors have discovered methods and materials that can solve the foregoing problem for many combinations of inorganic bodies and binder materials.

In one aspect, the present disclosure provides a composite particle comprising:
a single spheroidal core comprising at least one inorganic oxide, and
a polymeric layer disposed on and confining the spheroidal core, wherein the polymeric layer comprises a cationic surfactant and at least one of:
a nonionic polymer; or
an anionic polymer.

In another aspect, the present disclosure provides a composite particle comprising:
a single spheroidal core comprising at least one inorganic oxide, and
a polymeric layer disposed on and confining the spheroidal core, wherein the polymeric layer comprises a cationic polymer and an anionic polymer.

In another aspect, the present disclosure provides a composite material comprising a plurality of the composite particles according to the present disclosure dispersed in a binder material.

In another aspect, the present disclosure provides a method of making composite particles comprising, the method comprising:
providing a dispersion comprising a continuous aqueous phase and a dispersed phase comprising a polymeric layer disposed on and confining the spheroidal core, wherein the polymeric layer comprises a cationic surfactant and at least one of:
a nonionic polymer, or
an anionic polymer;
combining the dispersion with a plurality of spheroidal cores comprising at least one inorganic oxide such that respective polymeric layers are disposed on and confine each of at least a portion of the spheroidal cores to form the composite particles, and wherein each one of the composite particles contains a single spheroidal core; and
separating the composite particles from the continuous aqueous phase.

In another aspect, the present disclosure provides a method of making composite particles, the method comprising:
providing a dispersion comprising a continuous aqueous phase and a dispersed phase comprising a polymeric layer disposed on and confining the spheroidal core, wherein the polymeric layer comprises a polymeric layer disposed on and confining the spheroidal core, and wherein the polymeric layer comprises a cationic polymer and an anionic polymer;
combining the dispersion with a plurality of spheroidal cores comprising at least one inorganic oxide such that respective polymeric layers are disposed on and confine each of at least a portion of the spheroidal cores to form the composite particles, and wherein each one of the composite particles contains a single spheroidal core; and
separating the composite particles from the continuous aqueous phase.

In another aspect, the present disclosure provides composite particles prepared according to any method of the present disclosure.

The following definitions are used herein.

The term "anionic polymer" refers to a polymer having at least one (e.g., at least two, three, or four) negative charge and an equivalent amount of countercations.

The term "aqueous" means containing at least 5 weight percent of water.

The term "anionic surfactant" refers to a surfactant including an anionic moiety covalently bonded to a nonpolar moiety. Anionic surfactants do not contain at least one covalently bonded cationic moiety.

The term "bead" refers to a small round solid object. Beads are generally spheroidal in shape.

The term "cationic polymer" refers to a polymer having at least one positive charge and an equivalent amount of counteranions.

The term "cationic surfactant" refers to a surfactant including a cationic moiety covalently bonded to a non-polar moiety. Cationic surfactants do not contain at least one covalently bonded anionic moiety.

The term "conductive" refers to electrical conductivity, unless otherwise specified.

The term "emulsifier" refers to a surfactant used to keep mixtures of immiscible fluids well-dispersed. An emulsifier positions itself at the interface of the immiscible fluids thus preventing clumping of the molecules of the fluids. In the case of polymer emulsions, the term "emulsifier" may also refer to a surfactant used to disperse a polymer in an aqueous liquid phase.

The term "microbubble" refers to a hollow round particle having a maximum dimension of less than one millimeter.

The term "microsphere" refers to an ellipsoidal particle having a maximum dimension of less than one millimeter.

The term "monomer" refers to a substance composed of monomer molecules.

The term "monomer molecule" refers to a molecule which can undergo polymerization thereby contributing constitutional units to the essential structure of a macromolecule The term "monomer unit" refers to the largest constitutional unit contributed by a single monomer molecule to the structure of a polymer.

The term "nonionic" means not containing any covalently bonded ionic group.

The term "non-polymeric" in reference to a compound means that the compound is not a polymer.

The term "polymer" refers to a macromolecule having at least 10 sequential monomer units (or a substance composed of such macromolecules).

The term "insoluble" as applied to a substance in a liquid medium means that the substance forms a phase separate from the liquid medium. The substance may be dispersed in the liquid medium and be considered insoluble.

The term "solid" means having the physical state of a solid at 25° C. and one atmosphere pressure (100 kPa).

The term "spheroid" refers to an object of approximately spherical shape.

The term "spheroidal" means approximately spherical in shape.

The term "surfactant" refers to an organic surface active compound that lowers the surface tension of a liquid and lowers the interfacial tension between two liquids, or between a liquid and a solid. Surfactants generally possess a hydrophilic (polar) moiety and a lipophilic (nonpolar) moiety. Soaps and emulsifiers are included within the term surfactant.

The term "insoluble in water" means less than one weight percent soluble in water at 25 degrees Celsius (° C.).

The features and advantages of the present disclosure will be further understood upon consideration of the detailed description as well as the appended claims.

BRIEF DESCRIPTION OF THE DRAWINGS

FIGS. 1A-1C are cross-sectional views of exemplary composite particles according to the present disclosure.

Figure 1C:
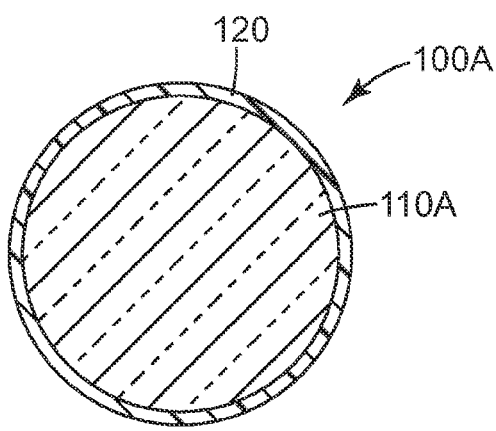

While the above-identified drawing figures set forth several embodiments of the present disclosure, other embodiments are also contemplated; for example, as noted in the discussion. In all cases, the disclosure is presented by way of representation and not limitation. It should be understood that numerous other modifications and embodiments can be devised by those skilled in the art, which fall within the scope and spirit of the principles of the disclosure. The figures may not be drawn to scale. Like reference numbers may have been used throughout the figures to denote like parts.

DETAILED DESCRIPTION

Referring now to FIG. 1A, exemplary composite particle 100A comprises a single spheroidal core 11 OA. Spheroidal core 11 OA is ellipsoidal and has a maximum dimension of less than or equal to one millimeter. Polymeric layer 120 is disposed on and confines spheroidal core 110. In the embodiment shown in FIG. 1, spheroidal core 11 OA is solid.

Referring now to FIG. 1B, exemplary composite particle 100B comprises a single spheroidal core 110B. Spheroidal core 110B is ellipsoidal and has a maximum dimension of less than or equal to one millimeter. In the embodiment shown in FIG. 1B, spheroidal core 110B has an outer wall 150 that encloses a hollow interior 152.

Figure 1C:
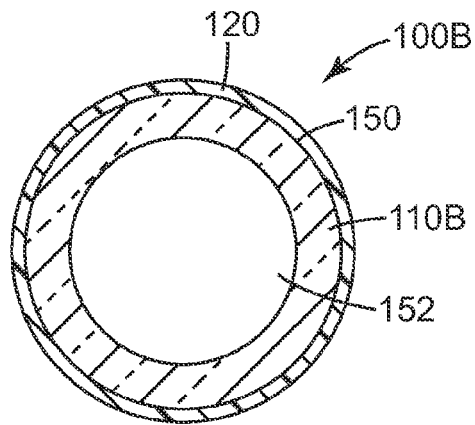
Figure 1C:
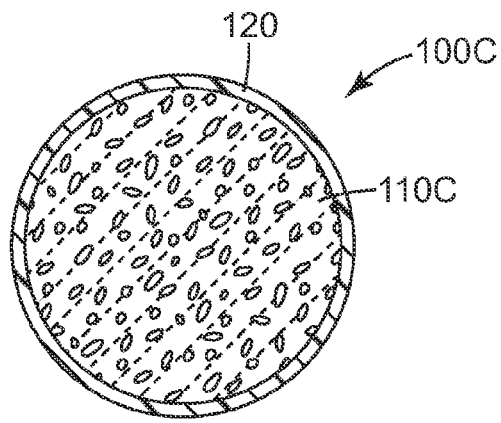

Referring now to FIG. 1C, exemplary composite particle 100C comprises a single spheroidal core 110C. Spheroidal core 110C is ellipsoidal and has a maximum dimension of less than or equal to one millimeter. In the embodiment shown in FIG. 1C, spheroidal core 110C is porous throughout its body.

The spheroidal core is typically spherical or mildly ellipsoidal in shape, although minor irregularities in the shape, e.g., as resulting from their manufacturing process are acceptable. The spheroidal core may have any size, but typically has a maximum dimension, or average diameter, of less than 10 millimeters, more typically less than one millimeter. In some embodiments, the spheroidal core has a maximum dimension in a size range of from 0.1 micron to one millimeter, from one micron to 500 microns, from one micron to 300 microns, or even from one micron to 100 microns.

The spheroidal core comprises an inorganic oxide (which includes both single and mixed oxides). Examples of suitable inorganic materials include glasses (e.g., soda lime glass, borosilicate glass), ceramics (e.g., alpha-alumina, zirconia, and alumina silicates), and metal oxides (e.g., titania, alumina, silver oxide, copper oxide, indium tin oxide). In some embodiments, the spheroidal core may comprise an oxide compound comprising at least one of silicon or aluminum. Examples of suitable spheroidal cores include solid glass beads, hollow glass beads (e.g., glass bubbles, including glass microbubbles), non-porous ceramic beads or microspheres (e.g., fly ash precipitator microspheres), porous or hollow ceramic beads (e.g., cenospheres), and metallic beads and bubbles having a metal oxide surface coating thereon (e.g., iron microspheres having an outer layer of ferric oxide, or silver coated glass microspheres having an outer layer of silver oxide thereon).

Commercially available materials suitable for use as spheroidal cores include, for example: glass bubbles marketed by 3M Company, Saint Paul, Minn., as 3M GLASS BUBBLES in grades K1, K15, K20, K25, K37, K46, S15, S22, S32, S35, S38, S38HS, S60, and S60HS; silica-alumina ceramic hollow spheres with thick walls marketed by Valentine Chemicals of Lockport, La., as ZEEOSPHERES CERAMIC MICROSPHERES in grades G-200, G200-PC, G-400, G600, G-800, G-850, N-200, N-200PC, N-400, N-600, N-800, N1000, and N1200; solid glass spheres available from Cospheric LLC, Santa Barbara, Calif. as SODA LIME SOLID GLASS MICROSPHERES, BOROSILICATE SOLID GLASS MICROSPHERES, BARIUM TITANATE GLASS SPHERES, and E GLASS SPHERES.

The polymeric layer is disposed on the spheroidal core and sufficiently covers the spheroidal core that it confines it (i.e., the polymeric layer sufficiently surrounds the spheroidal core that if the polymeric layer and the spheroidal core were capable of being moved independently, the spheroidal core could not be separated from the polymeric layer because of mechanical entrapment). For example, in one embodiment, the polymeric layer may completely enclose the spheroidal core. In another embodiment, the polymeric layer may not completely cover the surface of the spheroidal core yet still confine it by forming a continuous porous network over the surface of the spheroidal core. In yet another embodiment, the polymeric layer may cover greater than a hemispherical portion of the spheroidal core, thereby confining it. Coverage by the polymeric layer over and area contained within less than a hemisphere of the spheroidal core would not confine the spheroidal core. Likewise, coverage of the entire surface with a polymeric layer consisting of small unconnected portions would not confine the spheroidal core. In some embodiments, the polymeric layer is substantially uniform and complete (i.e., the polymeric layer forms a substantially complete layer of substantially uniform thickness over the surface of the spheroidal core).

Typically, any polymers (e.g., cationic polymer(s), anionic polymer(s), and/or nonionic polymer(s)) in the polymeric layer, and/or the polymeric layer itself, are solid or semi-solid, although this is not requirement (e.g., as in the case of ultraviscous fluids). In some embodiments, a relatively minor amount of liquid components (e.g., plasticizers) may be usefully included in the polymeric layer.

Composite particles according to the present disclosure comprise a single spheroidal core comprising at least one inorganic oxide. A polymeric layer is disposed on and confines the spheroidal core (e.g., contacting the inorganic oxide). In one embodiment, the polymeric layer comprises a cationic surfactant and at least one of a nonionic polymer or an anionic polymer. In another embodiment, the polymeric layer comprises a cationic polymer and an anionic polymer.

The cationic surfactant is generally used in at least a minimum effective amount that provides about a monolayer coverage of the spheroidal core, although other amounts can also be used. Generally, the cationic surfactant is used at a level of about 0.01 to 5 weight percent, or from 0.04 to 1 weight percent based on the total weight of the dispersion, although other amounts can also be used. Combinations of cationic surfactants may also be used, in which case the level may reflect the combined total of cationic surfactants.

Suitable cationic surfactants include, for example, quaternary ammonium salts having at least one higher molecular weight substituent and at least two or three lower molecular weight substituents linked to a common nitrogen atom. The counter ion to the ammonium cation is, for example, a halide (e.g., bromide, chloride, iodide, or fluoride), acetate, nitrite, or lower alkosulfate (e.g., methosulfate). The higher molecular weight substituent(s) of the ammonium cation are, for example, alkyl group(s), containing about 10 to about 20 carbon atoms. The lower molecular weight substituents of the ammonium cation are, for example, alkyl groups of about 1 to about 4 carbon atoms, such as methyl or ethyl. These alkyl groups are optionally substituted with hydroxy moieties. Optionally, one or more of the substituents of the ammonium cation can include an aryl moiety or be replaced by an aryl, such as benzyl or phenyl. Also among the possible lower molecular weight substituents are lower alkyls of about 1 to about 4 carbon atoms, such as methyl and ethyl, substituted by lower polyalkoxy moieties such as polyoxyethylene moieties, bearing a hydroxyl end group.

Exemplary cationic surfactants include alkylammonium salts having the formula $C_mH_{2m+1}N(CH_3)_3X$, where X is OH, Cl, Br, $HSO_4$ or a combination of OH and Cl, and where m is an integer from 8 to 22, and the formula $C_kH_{2k+1}N(C_2H_5)_3X$, where k is an integer from 12 to 18 and X is as defined above; gemini surfactants, for example those having the formula: $(C_{16}H_{33}N(CH_3)_2)_2C_pH_{2p}X_2$, wherein p is an integer from 2 to 12 and X is as defined above; and cetylethylpiperidinium salts, for example $C_{16}H_{33}N(C_2H_5)(C_5H_{10})X$, wherein X is as defined above; a mixture of alkyldimethylbenzylammonium chlorides wherein the alkyl chain contains from 10 to 18 carbon atoms Exemplary cationic emulsifiers include quaternary ammonium compounds, fatty amine salts (e.g., stearamidopropyl PG-dimonium chloride phosphate, behenamidopropyl PG dimonium chloride, stearamidopropyl ethyldimonium ethosulfate, stearamidopropyl dimethyl (myristyl acetate) ammonium chloride, stearamidopropyl dimethyl cetearyl ammonium tosylate, stearamidopropyl dimethyl ammonium chloride, stearamidopropyl dimethyl ammonium lactate), and polyoxyethylene fatty amine salts. For example alkyltriammonium salts, alkylbenzyldimethylammonium salts and alkylpyridinium salts.

The cationic surfactant may be added in any effective amounts. Typical amounts are in the range of from about 0.01 to 2 weight percent, more typical from about 0.04 to 1 weight percent, based on the total weight of the dispersion, although other amounts can also be used. A cationic polymer may serve the role of a cationic surfactant.

Exemplary nonionic polymers include polyolefins (e.g., polyethylene, polypropylene, polybutylene, polystyrene, polyisoprene, paraffin waxes, EPDM copolymer, or polybutadiene) and acrylic homopolymers and copolymers (e.g., polymethyl acrylate, polyethyl methacrylate, polyethyl acrylate, polyethyl methacrylate, polybutyl acrylate, or butyl methacrylate) that are free of ionic groups or groups that spontaneously ionize in water (e.g., carboxyl groups). Cationically-stabilized polyolefin emulsions are readily available from commercial sources, for example, under the trade designation "MICHEM EMULSION' (e.g., grades 09730, 11226, 09625, 28640, 70350) from Michelman, Inc., Cincinnati, Ohio.

Exemplary anionic polymers include homopolymers and copolymers containing ionized acidic groups such as, for example, homopolymers and copolymer of acrylic acid and/or methacrylic acid (e.g., deprotonated derivatives of polyacrylic acid or polymethacrylic acid, and deprotonated derivatives of ethylene/acrylic acid copolymers), deprotonated derivatives of ethylene/maleic acid copolymers, and deprotonated derivatives of styrenesulfonic acid copolymers (e.g., polystyrene sulfonate (PSS))

The neutral polymer and anionic polymer may be added in any amount that results in the polymeric layer being disposed on and confining a single spheroidal core. Amounts that are too low, may result in insufficient coverage of the spheroidal core, while excessively large amounts generally result in aggregates containing with multiple spheroidal cores. In general, above a certain concentration of the neutral/anionic polymers in the dispersion during preparation of the composite particles, aggregation of multiple spheroidal cores and the polymeric binder occurs. This concentration is referred to herein as the "critical concentration for aggregation" (CCA). For some embodiments, the CCA may be as low at about 5 weight percent, or lower, based on the total weight of the dispersion. In some embodiments, it may be much higher (e.g., about 25 weight percent).

Examples of cationic polymers include poly{oxyethylene (dimethyliminio)-ethylene-(dimethyliminio)-ethylene dichloride, polydiallyldimethylammonium chloride (polyDADMAC), copolymers of acrylamide with cationic monomers (e.g., trimethylammonioethyl acrylate), salts of poly (trimethylammonioethyl acrylate), and conductive cationic polymers such as, e.g., cationically charged poly(3,4-ethylenedioxythiophene).

In some embodiments, the polymeric layer comprises a conductive polymer. An exemplary such polymeric layer comprises poly(3,4-ethylenedioxythiophene)-poly(styrenesulfonate) (i.e., PEDOT/PSS), a combination of conductive cationic polymer and an anionic polymer, which is commercially available as a dispersion in water, and has a general structural formula shown below:

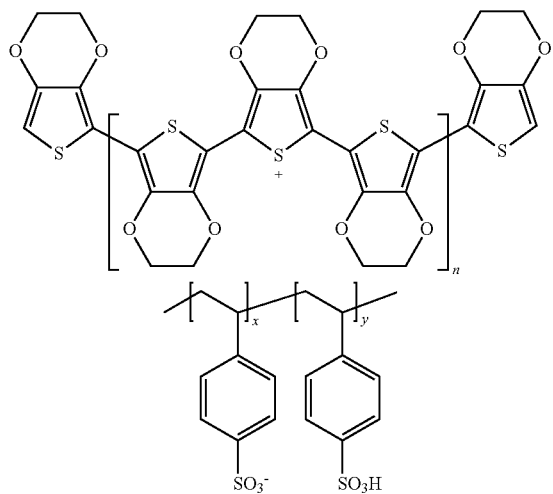

wherein n, x, and y represent positive integers. Exemplary PEDOT/PSS polymer dispersions are available under the trade designation "CLEVIOS" from Heraeus Clevios GmbH, Leverkusen, Germany. Examples include CLEVIOS P, CLEVIOS PH, CLEVIOS PH 500, CLEVIOS 510, CLEVIOS PH 1000, and CLEVIOS F 100 T. Unexpectedly, the present inventors have discovered that thin polymeric layers according to these embodiments can actually reduce electrical conductivity of glass spheroidal cores by orders of magnitude, while further increases in thickness may ultimately result in increased electrical conductivity, for example, as demonstrated in Example 2, hereinbelow.

The polymeric layer may contain optional additives such as, for example, plasticizers, fragrances, colorants, optical brighteners, antioxidants, and ultraviolet light stabilizers.

Advantageously, composite particles according to present disclosure do not tend to agglomerate, and pluralities of the composite particles are typically free-flowing when handled, although this is not a requirement.

Composite particles according to the present disclosure may be made, for example, by a process that includes combining a dispersion with a plurality of spheroidal cores according to the present disclosure such that respective polymeric layers according to the present disclosure are disposed on and confine each of at least a portion of the spheroidal cores. The dispersion comprises a continuous aqueous phase and a dispersed phase. The continuous aqueous phase includes water and optionally one or more water-soluble organic solvents (e.g., glyme, ethylene glycol, propylene glycol, methanol, ethanol, N-methylpyrrolidone, and/or propanol). The dispersed phase includes at least one of the nonionic polymer, anionic polymer, or the cationic polymer.

In some embodiments, the organic solvent may be capable of swelling polymer that is present in the dispersed phase thereby facilitating formation of the polymeric layer upon combining the spheroidal cores with the dispersion. Examples of useful solvents for swelling polymers include ethylene glycol and N-methylpyrrolidone. The amount of such swelling solvents to add will vary with the specific polymer, and concentration, and can be readily determined by those of skill in the art.

Once combined, typically with mixing, the polymeric layer forms on the spheroidal cores on a time scale of seconds to minutes or hours, although longer times can also be used. The amounts chemical components will vary depending on, for example, the total surface area of the spheroidal cores, concentration and desired thickness of the polymeric layer.

Once the composite particles are formed they can be isolated by conventional separation techniques such as, for example, filtration, optional washing, and drying.

Figure 2:
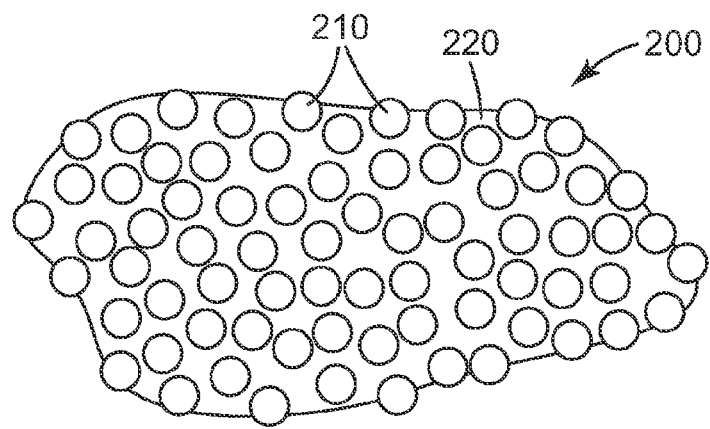
FIG. 2 is a cross-sectional views of an exemplary composite material according to the present disclosure.

Advantageously, composite particles made and isolated in this way tend to form free flowing composite particles that can be incorporated into binder materials with little or no clumping. Accordingly, composite particles according to the present disclosure can be combined with a binder material to form a composite material. An exemplary composite material is shown in FIG. 2, wherein composite material 200 comprises composite particles 210 according to the present disclosure (e.g., composite particles 100A, 100B, and/or 100C) dispersed in binder material 220.

The composite material can be readily prepared, for example, by combining the composite particles and binder material using an appropriate mixing method (e.g., melt-mixing, extruding, stirring, or kneading), typically until the composite particles are at least substantially uniformly dispersed in the binder material. While in order to reduce breakage, glass bubbles are typically added to molten thermoplastic (e.g., at a downstream zone of an extruder) instead of being combined with polymer pellets (i.e., not molten) and fed into the throat of the extruder, composite particles with a glass microbubble core according to the present disclosure typically exhibit improved durability (i.e., less breakage), if combined directly with polymer pellets and fed into the throat of an extruder, than the corresponding glass microbubbles without a polymeric outer coating.

The composite particles and the binder may be combined in any ratio, which ratio will typically be strongly influenced by the intended application. In some embodiments, the composite material is suitable for use as cable or pipe insulation. In some embodiments, the composite material is suitable for use as a pressure-sensitive adhesive.

Typically, the binder material is substantially organic, but this is not a requirement and inorganic binder materials can also be used. Suitable binder materials may be, for example, thermoplastic and/or thermosettable. The binder material may contain one or more additional components such as for example, fillers, rheology modifiers, tackifiers, curatives (e.g., initiators, hardeners, crosslinkers, catalysts), antioxidants, light stabilizers, inhibitors, colorants, fragrances, plasticizers, and lubricants.

Exemplary suitable binder materials include thermoplastics such as polyolefins (e.g., polyethylene, polypropylene, polybutylene, and polystyrene), polyamides, polyesters (e.g., polyethylene terephthalate and polycaprolactone), polyether ether ketones, polyetherimides, plasticized polyvinyl chlorides, cellulosic thermoplastics (e.g., cellulose acetate), and polyethers; and curable materials optionally comprising polyfunctional polymerizable monomers and/or oligomers (e.g., epoxy resins, urethane resins, acrylate monomers and/or oligomers, alkyd resins, and phenolic resins), optionally in combination with a suitable one or more curative compounds, for example, as will be known to those of skill in the art.

Figure 11:
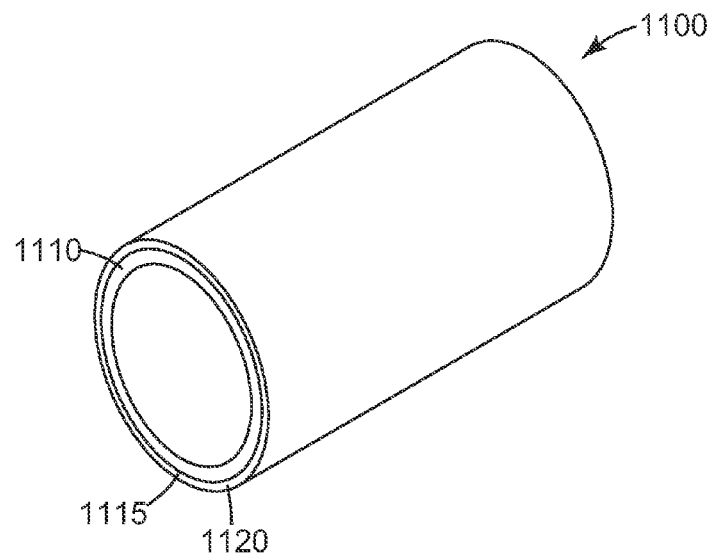
FIG. 11 is a schematic perspective view of a pipe having a corrosion-resistant layer according to one embodiment of the present disclosure.

Composite particles and composite materials according to the present disclosure may be used in applications where uncoated spheroidal particles (e.g., glass beads, glass microbubbles, or hollow ceramic microspheres) are used. Examples include corrosion-resistant layers. In one embodiment, composite particles comprise hollow glass microbubbles confined within a polymeric layer comprising polyolefin (e.g., polyethylene or polypropylene) and a cationic surfactant. These composite particles, if incorporated within a polyolefin matrix (e.g., polyethylene or polypropylene) are useful as a corrosion-resistant material for use in undersea gas and oil pipelines. Referring now to FIG. 11, in some embodiments, the present disclosure provides a corrosion-resistant pipe 1100 comprising a tubular metallic member 1110 having a corrosion-resistant layer 1120 disposed on an outer surface 1115 thereof. Corrosion-resistant layer 1110 comprises composite material according to the present disclosure.

Select Embodiments of the Present Disclosure

In embodiment 1, the present disclosure provides a composite particle comprising:
a single spheroidal core comprising at least one inorganic oxide, and
a polymeric layer disposed on and confining the spheroidal core, wherein the polymeric layer comprises a cationic surfactant and at least one of:
a nonionic polymer; or
an anionic polymer.

In embodiment 2, the present disclosure provides a composite particle according to embodiment 1, wherein the nonionic polymer comprises a hydrocarbon polymer.

In embodiment 3, the present disclosure provides a composite particle according to embodiment 1 or 2, wherein the first anionic polymer comprises a copolymer of an alkene and acrylic acid or a derivative thereof.

In embodiment 4, the present disclosure provides a composite particle comprising:
a single spheroidal core comprising at least one inorganic oxide, and
a polymeric layer disposed on and confining the spheroidal core, wherein the polymeric layer comprises a cationic polymer and an anionic polymer.

In embodiment 5, the present disclosure provides a composite particle according to embodiment 4, wherein the cationic polymer is conductive.

In embodiment 6, the present disclosure provides a composite particle according to embodiment 4 or 5, wherein the polymeric layer comprises PEDOT/PSS.

In embodiment 7, the present disclosure provides a composite particle according to any one of embodiments 1 to 6, wherein the spheroidal core is hollow.

In embodiment 8, the present disclosure provides a composite particle according to any one of embodiments 1 to 6, wherein the spheroidal core is free of interior voids.

In embodiment 9, the present disclosure provides a composite particle according to any one of embodiments 1 to 8, wherein the spheroidal core comprises glass.

In embodiment 10, the present disclosure provides a composite particle according to any one of embodiments 1 to 9, wherein the polymeric layer is substantially uniform and completely encloses the spheroidal core.

In embodiment 11, the present disclosure provides a composite particle according to any one of embodiments 1 to 10, wherein the spheroidal core has a maximum dimension of less than or equal to one millimeter.

In embodiment 12, the present disclosure provides a plurality of particles comprising a plurality of the composite particles of any one of embodiments 1 to 11, wherein the plurality of particles is free-flowing.

In embodiment 13, the present disclosure provides a method comprising combining the plurality of the composite particles of claim 12 and a binder material.

In embodiment 14, the present disclosure provides a method according to embodiment 13, wherein the composite particles are substantially uniformly dispersed in the binder material.

In embodiment 15, the present disclosure provides a method according to embodiment 13 or 14, wherein the binder material comprises molten polymer.

In embodiment 16, the present disclosure provides a composite material comprising a plurality of the composite particles of any one of embodiments 1 to 11 dispersed in a binder material.

In embodiment 17, the present disclosure provides a method according to embodiment 16, wherein the composite material comprises a thermoplastic polymer.

In embodiment 18, the present disclosure provides a method according to embodiment 17, wherein the thermoplastic polymer comprises polyethylene or polypropylene.

In embodiment 19, the present disclosure provides a pipe comprising a tubular metallic member having a corrosion-resistant layer disposed on an outer surface thereof, the corrosion-resistant layer comprising the composite material according to any one of embodiments 16 to 18.

In embodiment 20, the present disclosure provides a composite material according to embodiment 16, wherein the composite material is a pressure-sensitive adhesive.

In embodiment 21, the present disclosure provides a composite material according to embodiment 16, wherein the binder material comprises a curable material.

In embodiment 22, the present disclosure provides a method of making composite particles comprising, the method comprising:
providing a dispersion comprising a continuous aqueous phase and a dispersed phase comprising a polymeric layer disposed on and confining the spheroidal core, wherein the polymeric layer comprises a cationic surfactant and at least one of:

a nonionic polymer, or an anionic polymer;

combining the dispersion with a plurality of spheroidal cores comprising at least one inorganic oxide such that respective polymeric layers are disposed on and confine each of at least a portion of the spheroidal cores to form the composite particles, and wherein each one of the composite particles contains a single spheroidal core; and separating the composite particles from the continuous aqueous phase.

In embodiment 23, the present disclosure provides a method according to embodiment 22, wherein the nonionic polymer comprises a hydrocarbon polymer.

In embodiment 24, the present disclosure provides a method according to embodiment 22 or 23, wherein the first anionic polymer comprises a copolymer of an alkene and acrylic acid or a derivative thereof.

In embodiment 25, the present disclosure provides a method of making composite particles, the method comprising:

providing a dispersion comprising a continuous aqueous phase and a dispersed phase comprising a polymeric layer disposed on and confining the spheroidal core, wherein the polymeric layer comprises a polymeric layer disposed on and confining the spheroidal core, and wherein the polymeric layer comprises a cationic polymer and an anionic polymer;

combining the dispersion with a plurality of spheroidal cores comprising at least one inorganic oxide such that respective polymeric layers are disposed on and confine each of at least a portion of the spheroidal cores to form the composite particles, and wherein each one of the composite particles contains a single spheroidal core; and separating the composite particles from the continuous aqueous phase.

In embodiment 26, the present disclosure provides a method according to embodiment 25, wherein the polymeric layer comprises PEDOT/PSS.

In embodiment 27, the present disclosure provides a method according to any one of embodiments 22 to 26, wherein the spheroidal cores have maximum dimensions of less than one millimeter.

In embodiment 28, the present disclosure provides a method according to any one of embodiments 22 to 27, further comprising adding solvent to at least a portion of the dispersed phase.

In embodiment 29, the present disclosure provides a method according to any one of embodiments 22 to 28, wherein the spheroidal cores comprise microbubbles.

In embodiment 30, the present disclosure provides a method according to any one of embodiments 22 to 29, wherein the spheroidal cores are free of interior voids.

In embodiment 31, the present disclosure provides a method according to any one of embodiments 22 to 30, wherein the spheroidal cores comprise glass.

In embodiment 32, the present disclosure provides a method according to any one of embodiments 22 to 31, wherein the respective polymeric layers are substantially uniform and complete.

In embodiment 33, the present disclosure provides a method according to any one of embodiments 22 to 32, wherein the cationic polymer is conductive.

In embodiment 34, the present disclosure provides composite particles prepared according to the method of any one of embodiments 22 to 33.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

The following materials were used in the Examples.

Materials

| ABBREVIATION | DESCRIPTION |
|---|---|
| GB1 | 3M iM30K GLASS BUBBLES hollow glass microspheres having a true density of 0.60 g/cm$^3$, average diameter of 18 microns, and isostatic crush strength of 28,000 psi (190 MPa, 90% survival) from 3M Company, St. Paul, Minnesota |
| GB2 | 3M XLD6000 GLASS BUBBLES hollow glass microspheres having a true density of 0.30 g/cm$^3$, average diameter of 18 microns, and isostatic crush strength of 6,000 psi (41 MPa, 90% survival) from 3M Company |
| GB3 | Solid clear borosilicate glass microspheres, from MO-SCI Corporation, North Rolla, Missouri |
| GB4 | 3M iM16K GLASS BUBBLES hollow glass microspheres having a true density of 0.46 g/cm$^3$, average diameter of 20 microns, and isostatic crush strength of 16,500 psi (114 MPa, 90% survival) from 3M Company, St. Paul, Minnesota |
| DI water | deionized water having a electrical resistivity of 18.2 megohm · cm |
| DISP1 | CLEVIOS PH 1000 aqueous dispersion of a copolymer of poly(3,4-ethylenedioxythiophene) and poly(styrenesulfonate) (PEDOT/PSS) at a ratio of 1:2.5 PEDOT/PSS by weight, with 1.15% solids, viscosity of 30 mPa, density of 1 g/cc and pH at 20° C. of 2.0, from Heraeus Materials Technology, Chandler, Arizona |
| DISP2 | MICHEM EMULSION 09730 cationically-stabilized high density polyethylene (HDPE) emulsion containing a cationic emulsifier with 30% solids, Brookfield viscosity (spindle 2, 60 rpm) of less than 100 cps, density of 0.97 g/cc, and pH of 4.5, from Michelman, Cincinnati, Ohio |
| DISP3 | MICHEM EMULSION 11226 cationically-stabilized maleated propylene (MPP) emulsion containing a cationic emulsifier with 25.7% solids, Brookfield viscosity (spindle 2, 60 rpm) of less than 50 cps, density of 0.99 g/cc, and pH of 5.0, from Michelman |
| DISP4 | MICHEM EMULSION 09625 cationically-stabilized poly(ethylene-co-acrylic acid) (PEAA) emulsion containing a cationic emulsifier with 25% solids, Brookfield viscosity (spindle 2, 60 rpm) of less than 100 cps, density of 1.0 g/cc, and pH of 6.0, from Michelman |
| DISP5 | SYNTRAN PA-1445 nonionic/anionically stabilized polyethylene (PE) copolymer emulsion with 40% solids, Brookfield viscosity at 22° C. of 500 cps, density at 22° C. of 0.995, and pH at 22° C. of 9.3, from Interpolymer Corporation, Canton, Massachusetts |
| DISP6 | MICHEM EMULSION 70350 cationically-stabilized paraffin emulsion containing a cationic emulsifier with 50% solids, Brookfield viscosity (spindle 2, 60 rpm) of less than 500 cps, density of 0.95 g/cc, and pH of 5.5, from Michelman |
| EG | ethylene glycol |
| NMP | N-methylpyrrolidone |
| SURF1 | BYK 340 nonionic polymeric fluorosurfactant from BYK USA, Wallingford, Connecticut |

Test Methods

Alternating Current (AC) Bulk Resistance

AC bulk resistance of powders was measured using a high precision 1 kHz automated bridge (2500A 1 kHz Ultra-Precision Capacitance Bridge from Andeen Hagerling, Inc., Cleveland, Ohio) applying 1 lb-force (4.4 N), and then converted to resistivity using the geometric parameters of the cylindrical testing cell (height=2 mm, diameter=25 mm) as described in ASTM 257-07 "Standard Test Methods for DC Resistance or Conductance of Insulating Materials". The powder was densely packed before testing.

Comparative Example A

Comparative Example A was GB1, free of polymeric layers.

Examples 1-7 and Comparative Example B

Composite particles comprising a hollow glass microsphere core and a polymeric layer of PEDOT/PSS, disposed on and confining the core, were prepared. DI water (60.0 grams (g)), 3.0 g of EG, 1.0 g of NMP, 0.9 g of SURF1, and different amounts of DISP1 were mixed in that order before addition of 20.0 g of GB1. The composition was shear mixed using a SPEEDMIXER DAC 400 FVZ mixer (available from Flacktek, Inc., Landrum, S.C.) at room temperature (70° F. (21° C.)) for a total of 3 minutes (min) using three sequential intervals: 0.5 min at 1000 RPM, 2 min at 2500 RPM, and 0.5 min at 1000 RPM. The mixture was then slow-rolled (less than 10 RPM) for at least 3 hours before filtering. The mixture was subsequently vacuum filtered through a 22-micron filter and the particles dried at 110° C. in a convection oven for at least 3 hours. The mixtures were subsequently filtered and dried at 110° C. in a convection oven for at least 12 hours. The resulting material was slow-rolled further to loosen the composite particles. Compositions of the mixtures as well as final (i.e., after drying step) PEDOT/PSS average concentrations on composite particles are shown in Table 1, below. Final PEDOT/PSS concentration is expressed as weight percent based on the total weight of the composite particle and assumes that all available polymer was adsorbed onto the surface.

TABLE 1

| EXAMPLE | MIXTURE COMPOSITION, grams (g) | | | | | | DISP1 CONCENTRATION, |
| --- | --- | --- | --- | --- | --- | --- | --- |
|  | DI Water | EG | NMP | SURF1 | DISP1 | GB1 | weight percent |
| 1 | 60.0 | 3.0 | 1.0 | 0.9 | 0.10 | 20.0 | 0.01 |
| 2 | 60.0 | 3.0 | 1.0 | 0.9 | 0.51 | 20.0 | 0.03 |
| 3 | 60.0 | 3.0 | 1.0 | 0.9 | 1.01 | 20.0 | 0.06 |
| 4 | 60.0 | 3.0 | 1.0 | 0.9 | 6.01 | 20.0 | 0.39 |
| 5 | 60.0 | 3.0 | 1.0 | 0.9 | 11.95 | 20.0 | 0.77 |
| 6 | 60.0 | 3.0 | 1.0 | 0.9 | 12.02 | 20.0 | 1.53 |
| 7 | 60.0 | 3.0 | 1.0 | 0.9 | 24.01 | 20.0 | 3.01 |
| Comparative Example B | 60.0 | 3.0 | 1.0 | 0.9 | 48.01 | 20.0 | 5.04 |

AC bulk resistance of particles of Comparative Example A and composite particles of Examples 1-7 and Comparative Example B was measured as described above. In comparative Example B, clumping of multiple glass bubbles connected by resin was observed. Results are reported in Table 2, below.

TABLE 2

| EXAMPLE | AC BULK RESISTANCE, megohm · cm |
| --- | --- |
| Comparative Example A | 10.3 |
| 1 | 402.5 |
| 2 | 41937.1 |
| 3 | 4780.4 |

TABLE 2-continued

| EXAMPLE | AC BULK RESISTANCE, megohm · cm |
| --- | --- |
| 4 | 679.7 |
| 5 | 104.7 |
| 6 | 21.2 |
| 7 | 1.9 |
| Comparative Example B | 6.0 |

At the critical concentration for aggregation (CCA), polymer content in the aqueous dispersions reaches a point in which the composite particles start being bound by the polymeric layer and irreversible aggregation is observed. For the materials used in Examples 1-7 and Comparative Example B, CCA was determined to be about 5 weight percent.

Example 8

Composite particles were prepared as described in Example 1, except that the polymeric layer disposed on and confining the core comprised high density polyethylene and the use of ethylene glycol was omitted. DI water (30.0 g), 0.5 g of NMP, 0.05 g of SURF1 and 0.25 g of DISP2 were mixed in that order before addition of 10.0 g of GB1. The composition was shear mixed using a SPEEDMIXER DAC 400 FVZ mixer at room temperature (70° F. (21° C.)). for a total of 3 min using three sequential intervals: 0.5 min at 1000 RPM, 2 min at 2500 RPM and 0.5 min at 1000 RPM. The mixture was then slow-rolled (less than 10 RPM) for at least 3 hours before filtering. The mixture was subsequently vacuum filtered through a 22-micron filter, and the particles were dried in a convection oven at 110° C. for at least 3 hours. The average final concentration of high density polyethylene on the composite particles was calculated to be about 1 weight percent based on the total weight of the composite particle and assuming that all polymer added was adsorbed onto the particles surfaces.

Figure 3:
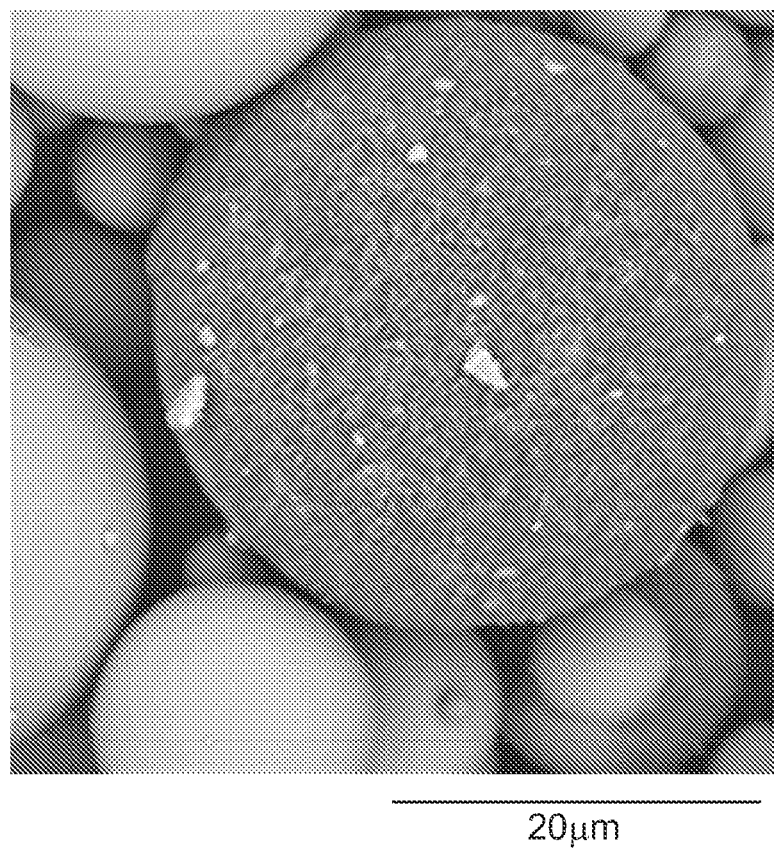
FIG. 3 is a scanning electron micrograph (SEM) of an individual composite particle of Example 8 taken at a magnification of 5700×.

FIG. 3 is a scanning electron micrograph (SEM) of an individual composite particle of Example 8 taken at a magnification of 5700x.

Example 9

Composite particles were prepared as described in Example 8, except that GB2 was used for the spheroidal core. DI water (30.0 g), 0.5 g of NMP, 0.05 g of SURF1 and 10 g of DISP2 were mixed in that order before addition of 10.0 g of GB2. The composition was shear mixed using a SPEEDMIXER DAC 400 FVZ mixer at room temperature (70° F. (21° C.)) for a total of 3 min using three sequential intervals: 0.5 min at 1000 RPM, 2 min at 2500 RPM and 0.5 min at 1000 RPM. The mixture was then slow-rolled (less than 10 RPM) for at least 3 hours before filtering. The mixture was subsequently vacuum filtered through a 22-micron filter, and the particles were dried in a convection oven at 110° C. for at least 3 hours. Final concentration of high density polyethylene on the surface of each glass bubble was calculated to be 23 weight percent based on the total weight of the composite particle.

Figure 4:
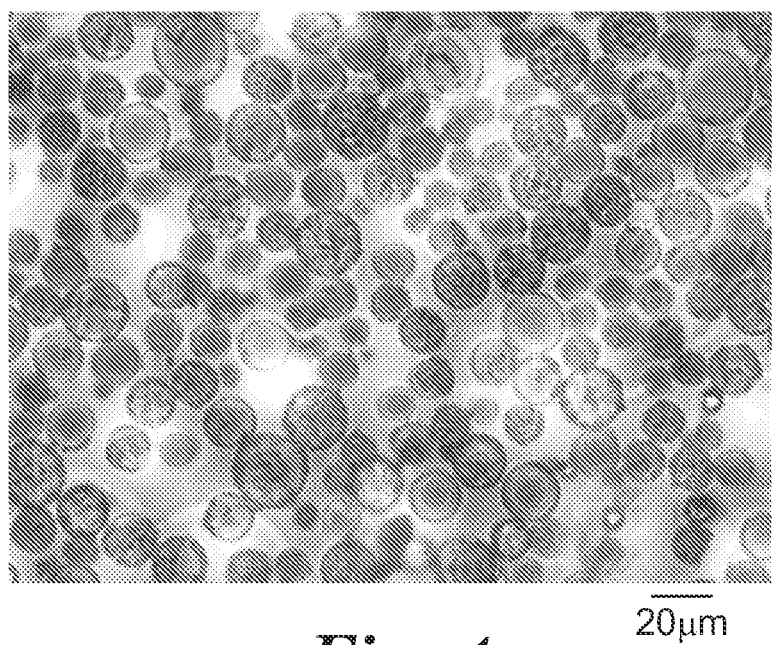
FIG. 4 is an optical micrograph of composite particles of Example 9 taken with an optical microscope at a magnification of 50×.

FIG. 4 is an optical micrograph of composite particles of Example 9 taken with an optical microscope at a magnification of 50×.

For the materials in Examples 8 and 9, CCA was determined to be 25 weight percent.

Comparative Example C

Comparative Example C was GB2, free of polymeric layers.

Examples 10-12 and Comparative Example D

Composite particles were prepared as described in Example 9, except that the polymeric layer disposed on and confining the core comprised cationically stabilized maleated polypropylene. DI Water (30.0 g), 0.5 g of NMP, 0.05 g of SURF1 and different amounts of DISP3 (see Table 3) were mixed in that order before addition of 10.0 g of GB2. The composition was shear mixed using a SPEEDMIXER DAC 400 FVZ mixer at room temperature (70° F. (21° C.)) for a total of 3 min using three sequential intervals: 0.5 min at 1000 RPM, 2 min at 2500 RPM and 0.5 min at 1000 RPM. The mixture was then slow-rolled (less than 10 RPM) for at least 3 hours before filtering. The mixture was subsequently vacuum filtered through a 22-micron filter, and the particles were dried in a convection oven at 110° C. for at least 3 hours. Compositions of the mixtures as well as final maleated polypropylene concentration on the surface of the core are shown in Table 3, below.

Figure 5A:
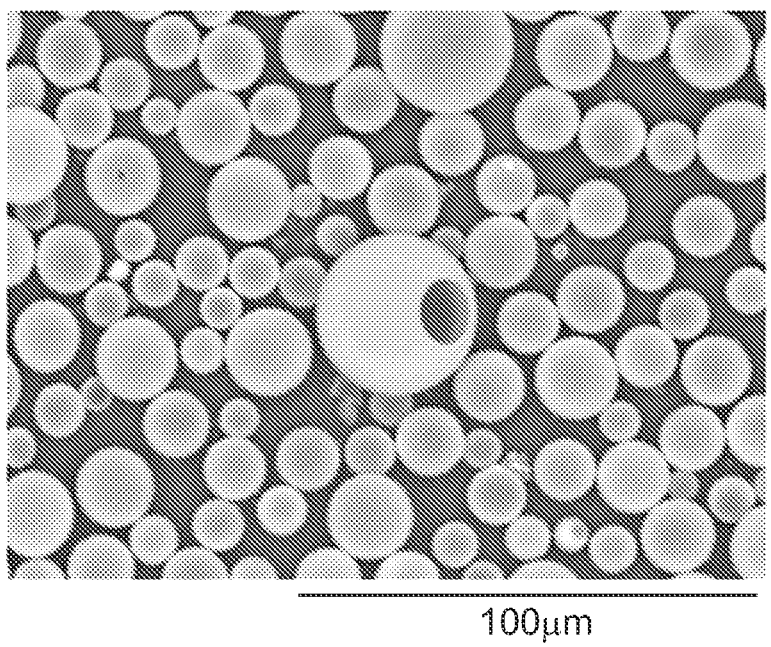
FIGS. 5A-5E are scanning electron micrographs of: particles of Comparative Example C (FIG. 5A), composite particles of Example 10 (FIG. 5B), composite particles of Example 11 (FIG. 5C), composite particles of Example 12 (FIG. 5D), and particles of Comparative Example D (FIG. 5E).
Figure 5B:
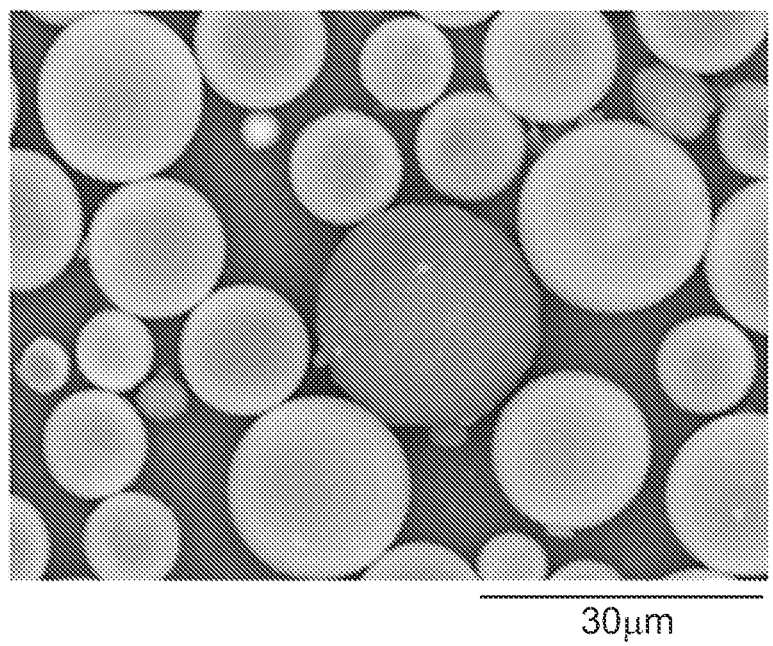
Figure 5C:
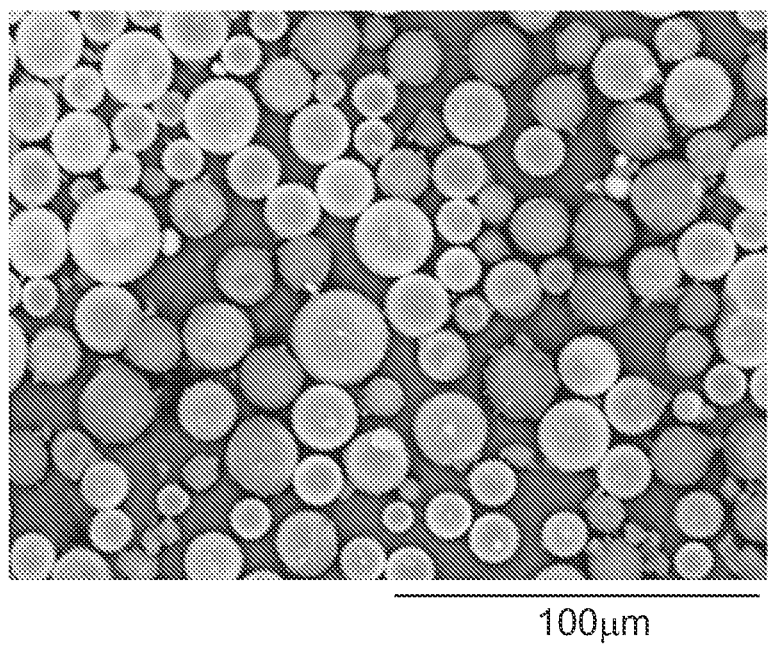
Figure 5D:
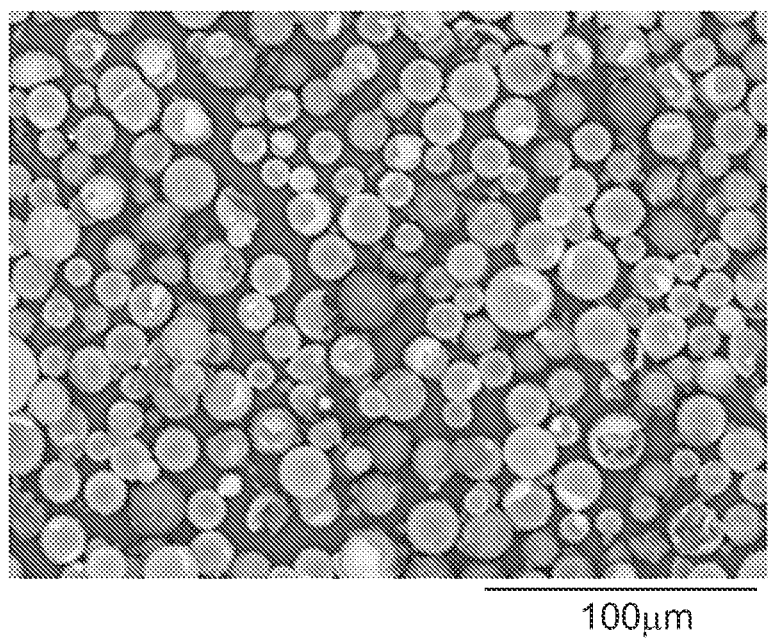
Figure 5E:
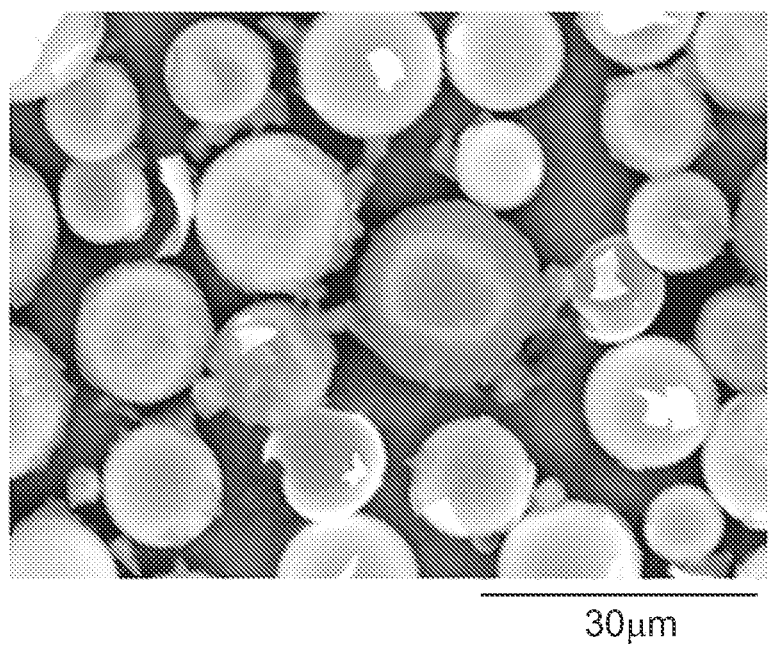
Figure 6A:
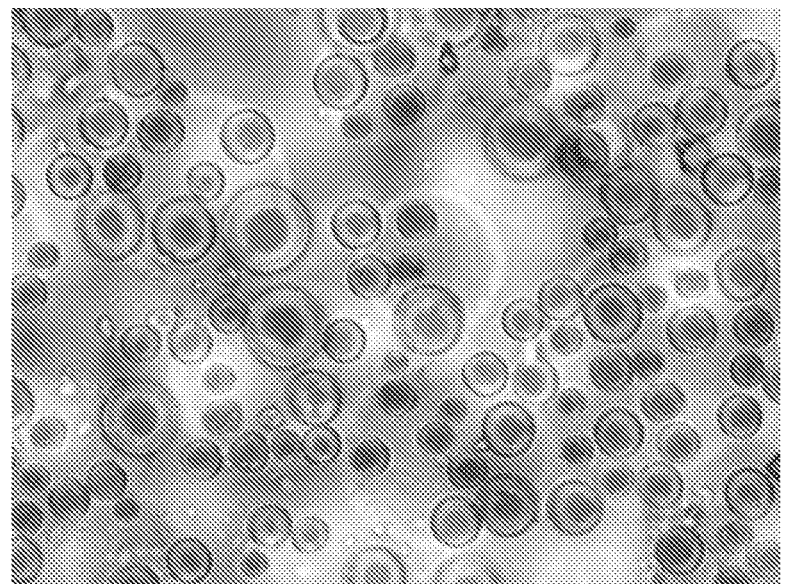
FIGS. 6A-6D are optical micrographs of particles of Comparative Example B (FIG. 6A), and composite particles of Examples 10 (FIG. 6B), 11 (FIG. 6C), and 12 (FIG. 6D).
Figure 6B:
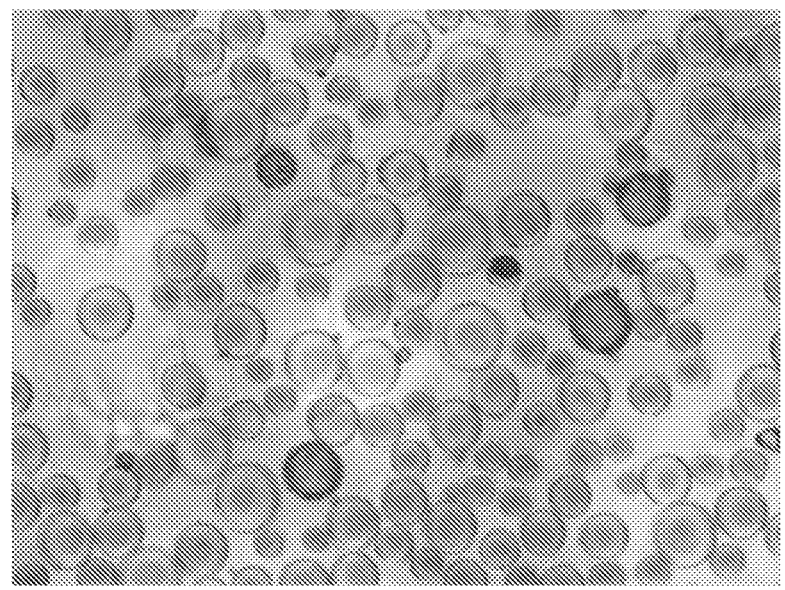
Figure 6C:
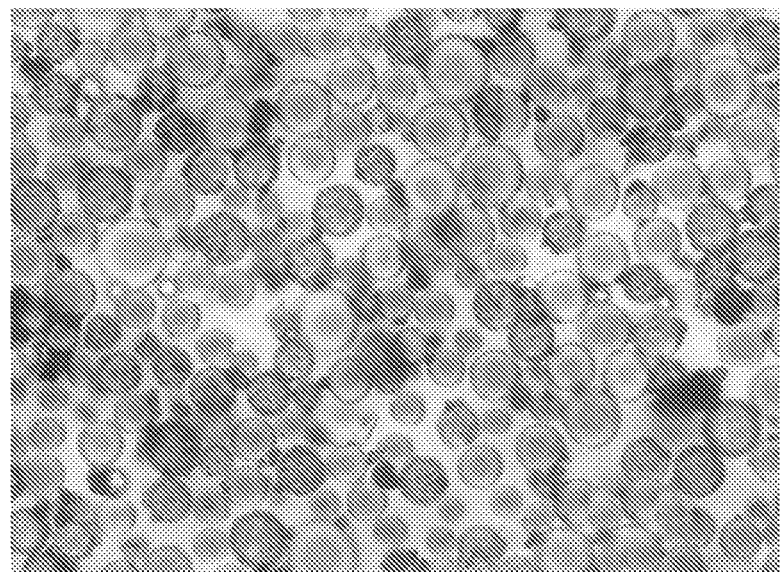
Figure 6D:
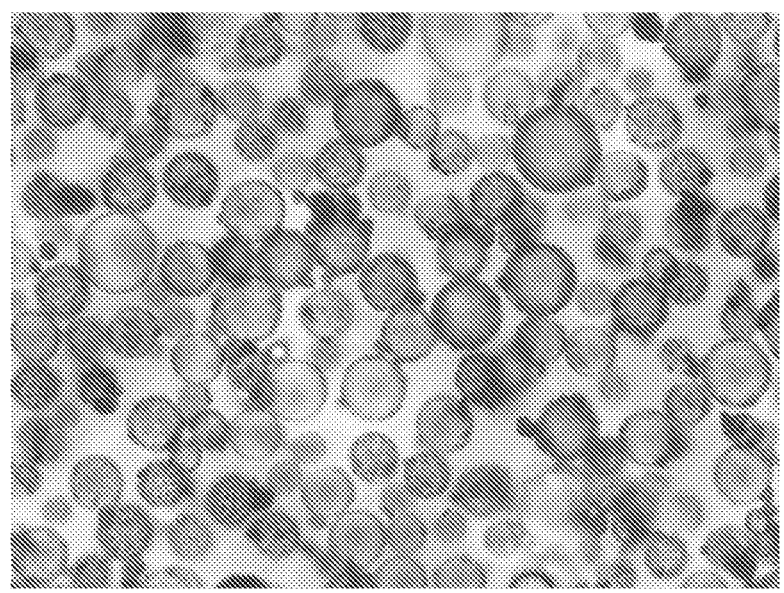

FIGS. 5A-5E are SEMs of: particles of Comparative Example C with a Hitachi™ 3000 Tabletop Scanning Electron Microscope at a magnification of 1000× (FIG. 5A), composite particles of Example 10 at a magnification of 2000× (FIG. 5B), composite particles of Example 11 at a magnification of 800× (FIG. 5C), composite particles of Example 12 at a magnification of 600× (FIG. 5D), and particles of Comparative Example D at a magnification of 2000× (FIG. 5E).

FIGS. 6A-6D are optical micrographs of particles of Comparative Example B (FIG. 6A), and composite particles of Examples 10 (FIG. 6B), 11 (FIG. 6C), and 12 (FIG. 6D), taken at a magnification of 50×.

For the materials used in Examples 10-12 and Comparative Example D, CCA was determined to be 23 weight percent.

Example 13-14 and Comparative Example E

Composite particles were prepared as described in Example 9, except that the polymeric layer disposed on and confining the core comprised poly(ethylene-co-acrylic acid). DI Water (30.0 g), 0.5 g of NMP, 0.05 g of SURF1, and different amounts of DISP4 (see Table 4) were mixed in that order before addition of 10.0 g of GB2. The composition was shear mixed using a SPEEDMIXER DAC 400 FVZ mixer at room temperature (70° F. (21° C.)) for a total of 3 min using three sequential intervals: 0.5 min at 1000 RPM, 2 min at 2500 RPM and 0.5 min at 1000 RPM. The mixture was then slow-rolled (less than 10 RPM) for at least 3 hours before filtering. The mixture was subsequently vacuum filtered through a 22-micron filter, and the particles were dried in a convection oven at 110° C. for at least 3 hours. Compositions of the mixtures as well as final poly(ethylene-co-acrylic acid) average weight percent in the composite particles are shown in Table 4, below.

TABLE 3

| EXAMPLE | MIXTURE COMPOSITION, grams | | | | | DISP3 CONCENTRATION, weight percent |
|---|---|---|---|---|---|---|
| | DI Water | NMP | SURF1 | DISP3 | GB2 | |
| Comparative Example C | 30.0 | 0.5 | 0.05 | 0 | 10.0 | 0 |
| 10 | 30.0 | 0.5 | 0.05 | 1.0 | 10.0 | 3 |
| 11 | 30.0 | 0.5 | 0.05 | 5.0 | 10.0 | 13 |
| 12 | 30.0 | 0.5 | 0.05 | 7.0 | 10.0 | 15 |
| Comparative Example D | 30.0 | 0.5 | 0.05 | 15.0 | 10.0 | 32 |

TABLE 4

| | MIXTURE COMPOSITION, grams | | | | | DISP4 CONCENTRATION, weight percent |
|---|---|---|---|---|---|---|
| | DI Water | NMP | SURF1 | DISP4 | GB2 | |
| EXAMPLE 13 | 30.0 | 0.5 | 0.05 | 2.0 | 10.0 | 5 |
| EXAMPLE 14 | 30.0 | 0.5 | 0.05 | 5.0 | 10.0 | 13 |
| COMPARATIVE EXAMPLE E | 30.0 | 0.5 | 0.05 | 10.0 | 10.0 | 24 |

Figure 7A:
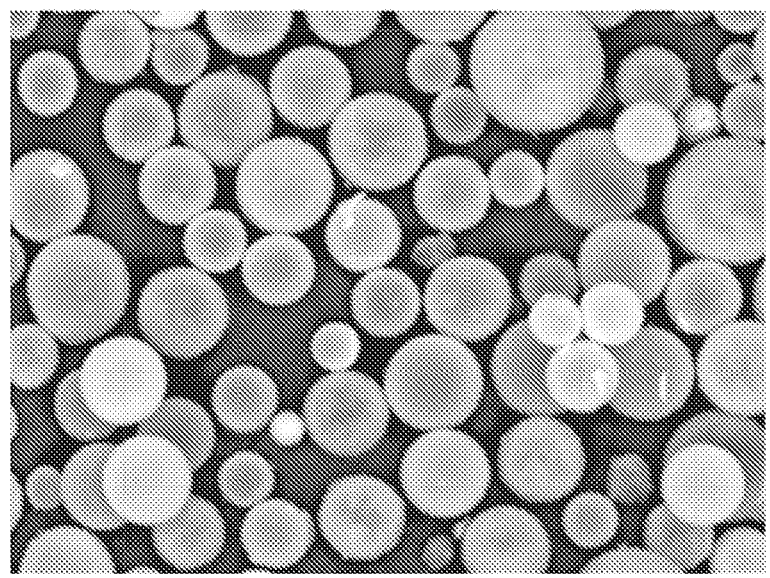
FIGS. 7A-7B are scanning electron micrographs of composite particles of Example 13 (FIG. 7A) and particles of Comparative Example E (FIG. 7B).
Figure 7B:
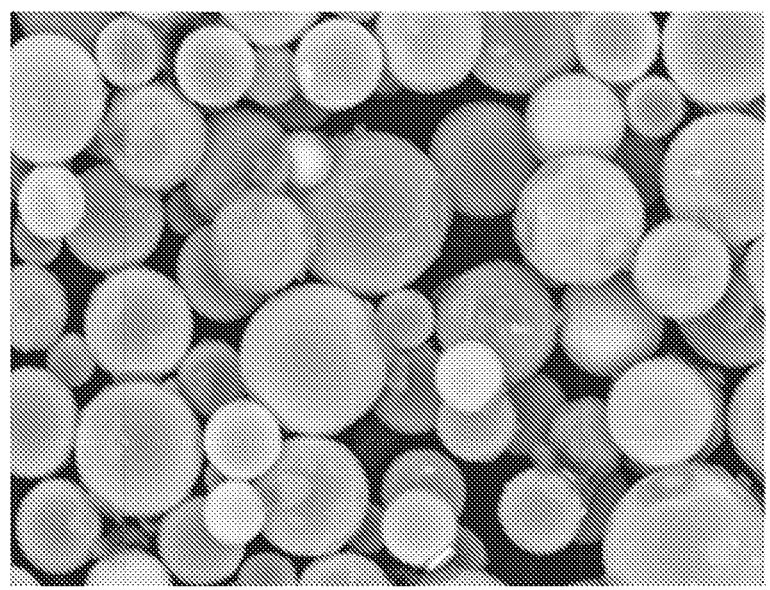
Figure 8A:
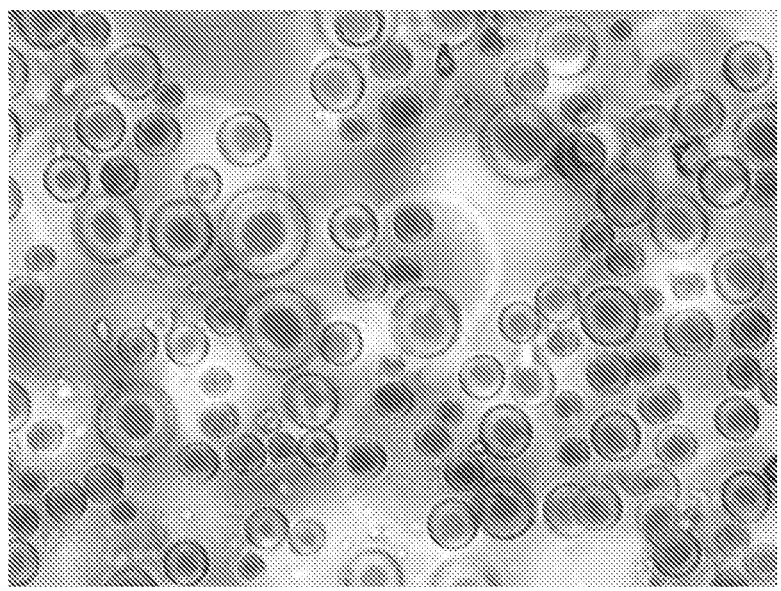
FIGS. 8A-8D are optical micrographs of particles of Comparative Example B (FIG. 8A), composite particles of Example 13 (FIG. 8B), particles of Comparative Example E (FIG. 8C), and Comparative Example F (FIG. 8D).
Figure 8B:
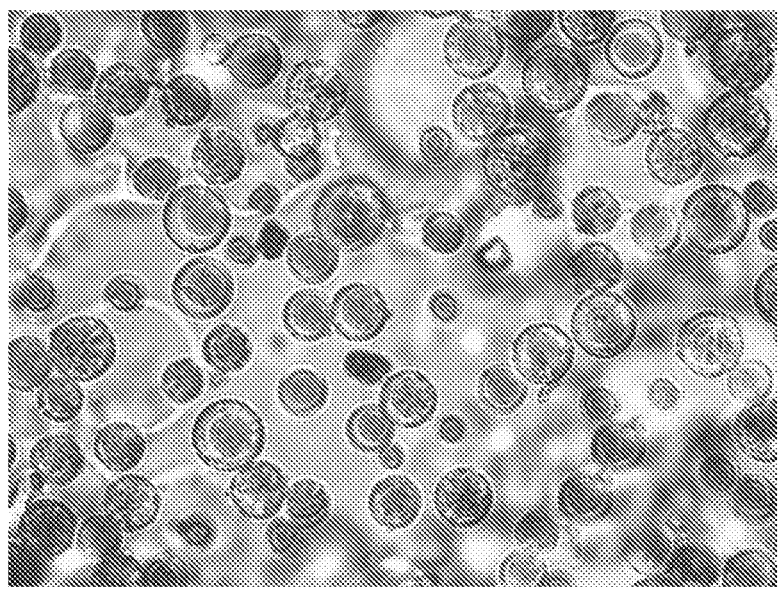
Figure 8C:
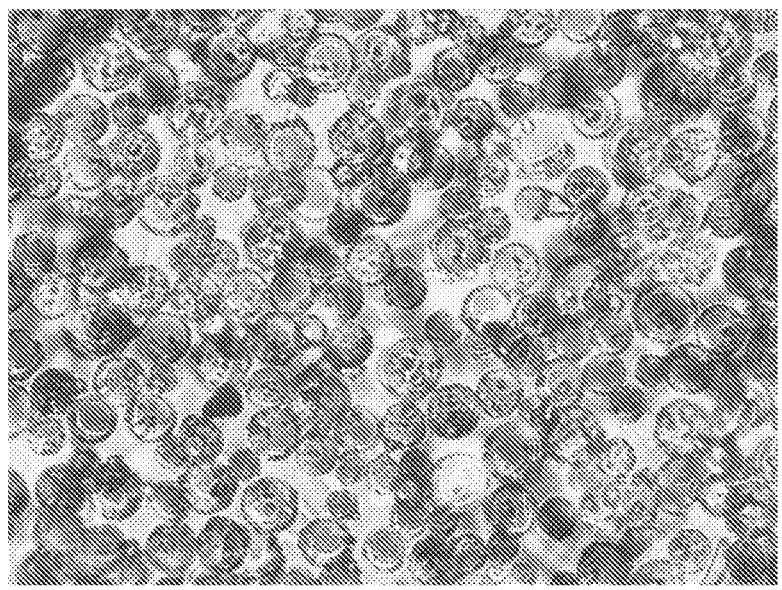
Figure 8D:
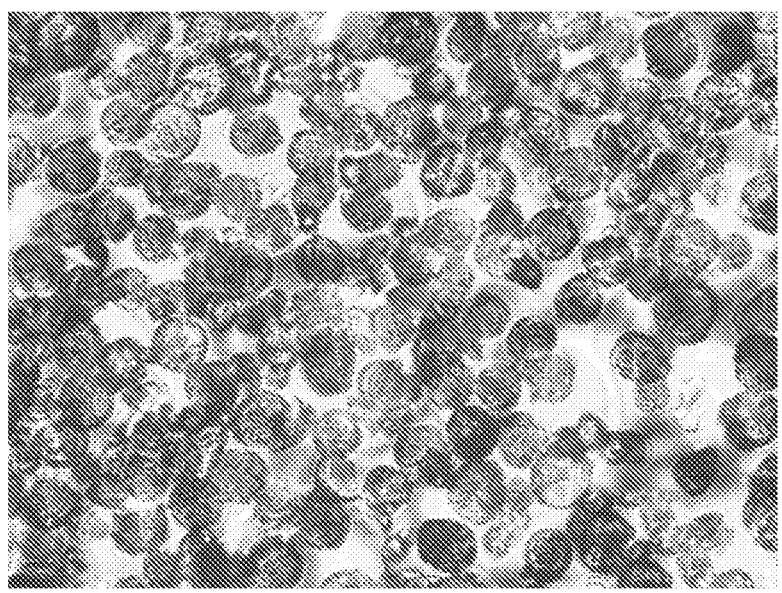

FIGS. 7A-7B shows SEMs of composite particles of Example 13 (FIG. 7A) and particles of Example 14 (FIG. 7B), at magnifications of 1200× and 1500×, respectively.

FIGS. 8A-8D show optical micrographs of particles of Comparative Example B (FIG. 8A), composite particles of Example 13 (FIG. 8B), and particles of Example 14 (FIG. 8C) and Comparative Example E (FIG. 8D), at a magnification of 50×. In Comparative Example E, multiple spheroidal cores were aggregated together.

For the materials used in Examples 13 and 14, and Comparative Example E, CCA was determined to be greater than 13 weight percent.

Example 15

Composite particles were prepared as described in Example 9, except that GB3 was used for the spheroidal core. DI Water (8.0 g), 0.16 g of NMP, 0.01 g of SURF1 and 4.0 g of DISP2 were mixed in that order before addition of 4.0 g of GB3. The composition was shear mixed using a SPEEDMIXER DAC 400 FVZ mixer at room temperature (70° F. (21° C.)) for a total of 3 min using three sequential intervals: 0.5 min at 1000 RPM, 2 min at 2500 RPM and 0.5 min at 1000 RPM. The mixture was then slow-rolled (less than 10 RPM) for at least 3 hours before filtering. The mixture was subsequently vacuum filtered through a 22-micron filter, and the particles were dried in a convection oven at 110° C. for at least 3 hours. Final concentration of high density polyethylene on the surface of each core was calculated to be 23 weight percent based on the total weight of the composite particle.

Figure 9:
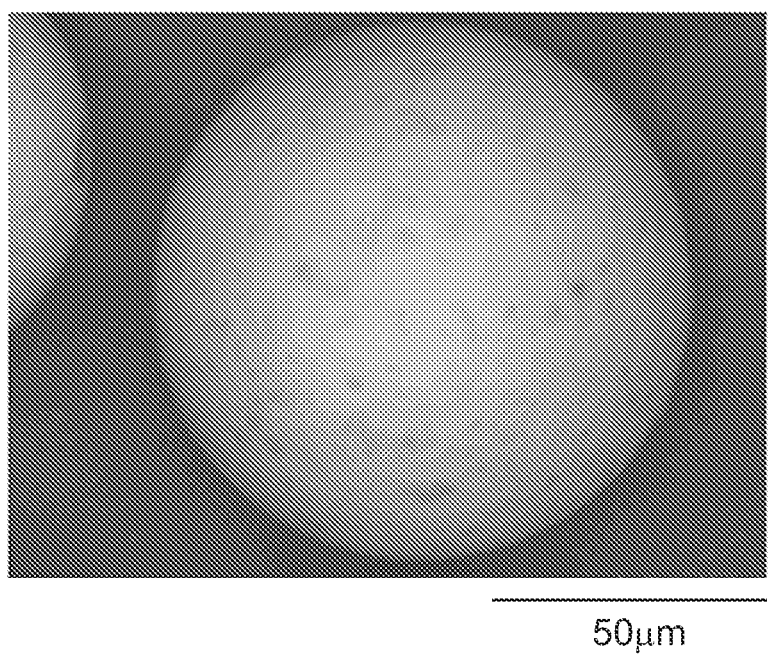
FIG. 9 is a scanning electron micrograph of composite particles of Example 14.

FIG. 9 is a SEM of composite particles of Example 15 at a magnification of 1200×.

Comparative Example F

Particles were prepared as described in Example 8, except that the polymer used was a nonionic/anionically stabilized polyethylene copolymer. DI Water (30.0 g), 0.5 g of NMP, 0.05 g of SURF1 and 0.25 g of DISP5 were mixed in that order before addition of 10.0 g of GB1. The composition was shear mixed using a SPEEDMIXER DAC 400 FVZ mixer at room temperature (70° F. (21° C.)) for a total of 3 min using three sequential intervals: 0.5 min at 1000 RPM, 2 min at 2500 RPM and 0.5 min at 1000 RPM. The mixture was then slow-rolled (less than 10 RPM) for at least 3 hours before filtering. The mixture was subsequently vacuum filtered through a 22-micron filter, and the particles were dried in a convection oven at 110° C. for at least 3 hours.

Figure 10A:
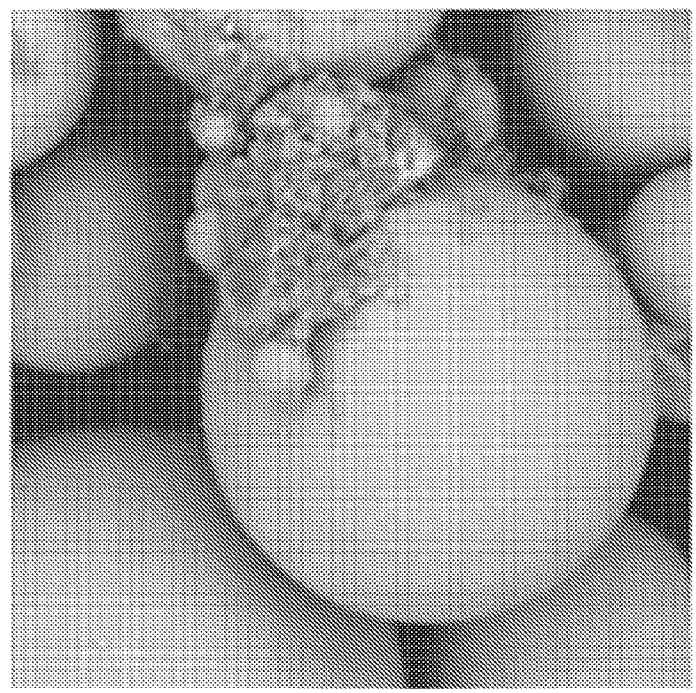
FIGS. 10A and 10B are scanning electron micrographs of particles of Comparative Example G at a magnification of 8400× (FIG. 10A) and a magnification of 2680× (FIG. 10B).
Figure 10B:
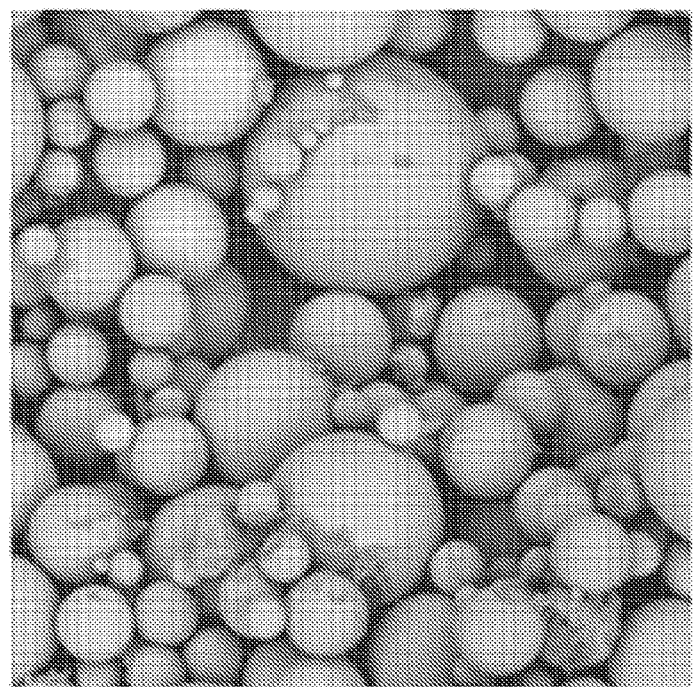

FIGS. 10A and 10B show SEMs of particles of Comparative Example F at a magnification of 8400× (a) and a magnification of 2680× (b). A polymeric layer disposed on and confining the core was not evident.

Comparative Example G

The procedure of Example 17 was repeated, except using GB2 hollow microspheres with no polymeric layer.

Test Methods

Hollow Glass Microsphere Survival During Compounding

In order to determine the volume loss due to hollow glass microsphere breakage, compounded pellets were exposed to high temperature in an oven in order to volatilize the polymer resin. The oven was set with a temperature ramp profile to run from 200° C. to 550° C. in 5 hours. After the temperature reached 550° C., it was kept constant for 12 hours. The density of the remaining ash, i.e. essentially glass bubbles, was determined with a Micromeritics ACCUPYC 1330 helium pycnometer (available from Micromeritics Instrument Corporation, Norcross, Ga.). The following formula was used to determine the percent volume loss of hollow glass microspheres due to breakage during compounding.

$$\% \text{ volume loss} = \frac{A-B}{A} \times 100$$

wherein $$A = \left( \frac{1}{\text{initial density of glass bubbles}} - \frac{1}{\text{density of solid glass}} \right)$$

and $$B = \left( \frac{1}{\text{measured density of glass bubbles}} - \frac{1}{\text{density of solid glass}} \right)$$

where density of solid glass=2.54 g/cm³.

Mechanical properties of the injection-molded composites were measured using ASTM standard test methods listed in Table 5, below.

TABLE 5

| PROPERTY | ABBREVIATION | ASTM TEST METHOD |
| --- | --- | --- |
| Tensile Modulus (kilopounds/square inch, ksi) | TM | D-638 |
| Tensile Strength (ksi) | TS | D-638 |
| Elongation at break (%) | EL | D-638 |
| Notched Izod Impact (Joules/meter) | NI | D-256 |

Testing results for Example 15 and Comparative Example G are given in Table 6, below.

TABLE 6

| | EL % | TM ksi | TS ksi | NI J/m | HOLLOW GLASS MICROSPHERES SURVIVAL % |
| --- | --- | --- | --- | --- | --- |
| EXAMPLE 15 | 480 | 132 (910 MPa) | 2.2 (15 MPa) | 17 | 98-100 |
| COMPARATIVE EXAMPLE G | no break | 123 (848 MPa) | 2 (14 MPa) | 18.2 | 85-95 |

Example 16

The procedure of Example 2 was repeated, except that GB2 was used in place of GB1.

Example 17

Composite particles were prepared as described in Example 1, except that the polymeric layer disposed on and confining the core comprised paraffin and the use of ethylene glycol was omitted. DI water (150.0 g), 2.5 g of NMP, 0.25 g of SURF1 and 3.10 g of DISP6 were mixed in that order before addition of 50.0 g of GB4. The composition was shear mixed using a SPEEDMIXER DAC 400 FVZ mixer at room temperature (70° F. (21° C.)). for a total of 3 min using three sequential intervals: 0.5 min at 1000 RPM, 2 min at 2500 RPM and 0.5 min at 1000 RPM. The mixture was then slow-rolled (less than 10 RPM) for at least 3 hours before filtering. The mixture was subsequently vacuum filtered through a 22-micron filter, and the particles were dried in a convection oven at 110° C. for at least 3 hours. The average final concentration of paraffin on the composite particles was calculated to be about 3 weight percent based on the total weight of the composite particle and assuming that all polymer added was adsorbed onto the particles surfaces.

Example 18

Composite particles of Example 17 were dry blended with PRO-FAX 6523 polypropylene (melt flow rate 4.00 g/10 min @ 230° C./2.16 kg) available from LyondellBasell Polymers (Rotterdam, The Netherlands). The admixture was introduced into the hopper of a 28 mm BOY 22D injection molding machine with a barrel diameter of 75 mm.

The composite particles in this example were bound to the surface of the pellets effectively as well as to each other essentially preventing settling of the particles to the bottom of the hopper and separation from the polymer pellets. Such an admixture could successfully be fed through the hopper into the rectangular barrel opening (with a dimension of 41 mm by 26 mm) of an injection molding without the particles settling from pellets.

Comparative Example H

Example 18 was repeated, except that the composite particles were replaced with GB4 hollow glass microspheres (corresponding to the cores of the composite particles in Example 22). The GB4 hollow glass microspheres separated from the polymer pellets and settled to the bottom of the hopper essentially preventing successful running of the injection molding machine.

Examples 19-22 and Comparative Example I

Composite particles of Examples 9, 11, 13, and 16 (respectively corresponding to Examples 19-22) to and GB2 hollow glass microspheres (corresponding to Comparative Example I) were combined with pellets of PRO-FAX 6523 polypropylene and fed into a PRISM TSE 24 MC co-rotating intermeshing 24 MM twin screw extruder with an L/D 28:1 from Thermo Electron Corp., equipped with a side water bath and a pelletizer system. The glass bubble was introduced in the feed throat of the extruder along with the PP resin via separate feeders. Zone 1 of the extruder was cooled with water to prevent premature melting and bridging. The temperature of zones 2 to 7 was set to 190° C., 220° C., 220° C., 220° C., 220° C., 220° C., respectively. The die temperature was set to 220° C. The screw rotation speed was set to 300 rpm. Both the resin and the glass bubble feeders were volumetric, and were calibrated to produce 15 weight percent glass bubbles in polypropylene. The extrudate was cooled in a water bath and pelletized. Throughput was about 6 lbs/hr (2.7 kg/hr).

Figure 12:
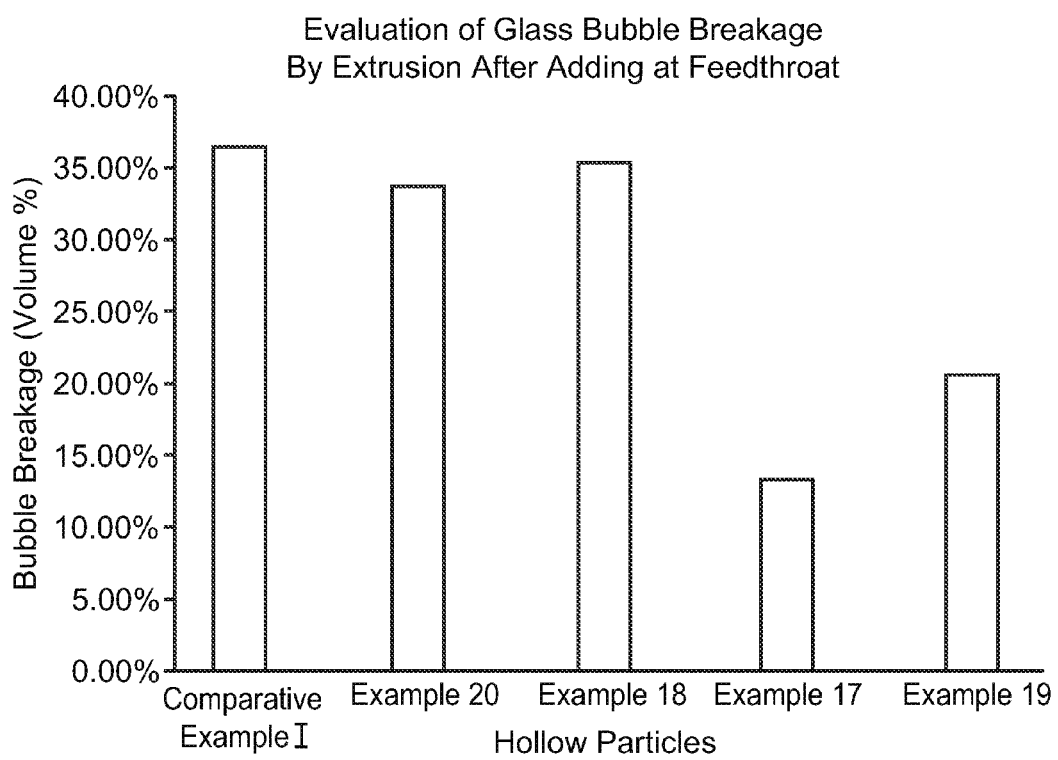
FIG. 12 is a plot of breakage (as a volume percentage) of various coated and uncoated glass bubbles during the extrusion process of Example 19.

FIG. 12 shows the breakage (as a volume percentage) of various coated and uncoated glass bubbles during the extrusion process.

Corrosion Testing of Composite Particles

In order to test the corrosion resistance of the composite particles, composite particles according to Examples 9, 11, 13, and 16, and GB2 hollow glass microspheres were tested in a pressurized bomb, stirred constantly at 80° C. (see test method description below) to simulate high pressure to simulate the ocean depth, high temperature to simulate the hot oil flowing through pipe, and seawater for the subsea environment.

Seawater aging of hollow microspheres was carried out in a high pressure, stainless steel bomb. This test is used to simulate subsea aging. Forty (40) volume percent of hollow microspheres (coated or uncoated) were added to synthetic seawater (obtained as ASTM D1141 SUBSTITUTE OCEAN WATER 4 L BOTTLE from Ricca Chemical Company, Arlington, Tex.), and then poured in to the bomb. The bomb was sealed, and then nitrogen gas was added to pressurize the bomb to 500 psi (3.4 MPa). The bomb was placed into a roller oven and was roll-stirred at 15 rpm constantly during aging at 80° C.

Specimens were taken every week and analyzed for specific density by pycnometer testing. Density of the injection molded parts was measured from the known weight of the injection molded parts divided by the volume of the specimens. The volume of the specimens were determined from the known molded weight of unfilled homopolymer polypropylene PROFAX 6523 from LyondellBasell and its known density (0.9 g/cc) as measured by a Micromeritics ACCUPYC 1330 gas pycnometer (from Micromeritics, Norcross, Ga.) in a 10 cc cup using helium gas as the displacement medium.

If glass bubbles corrode, they tend to crack and defects form at the surface eventually causing the bubble to break. Broken bubbles do not maintain their low density and revert back to the specific gravity of the fused glass—2.55 g/cm$^3$. By drying each specimen and measuring its density, bubble breakage is indicated by an increase in density.

Figure 13:
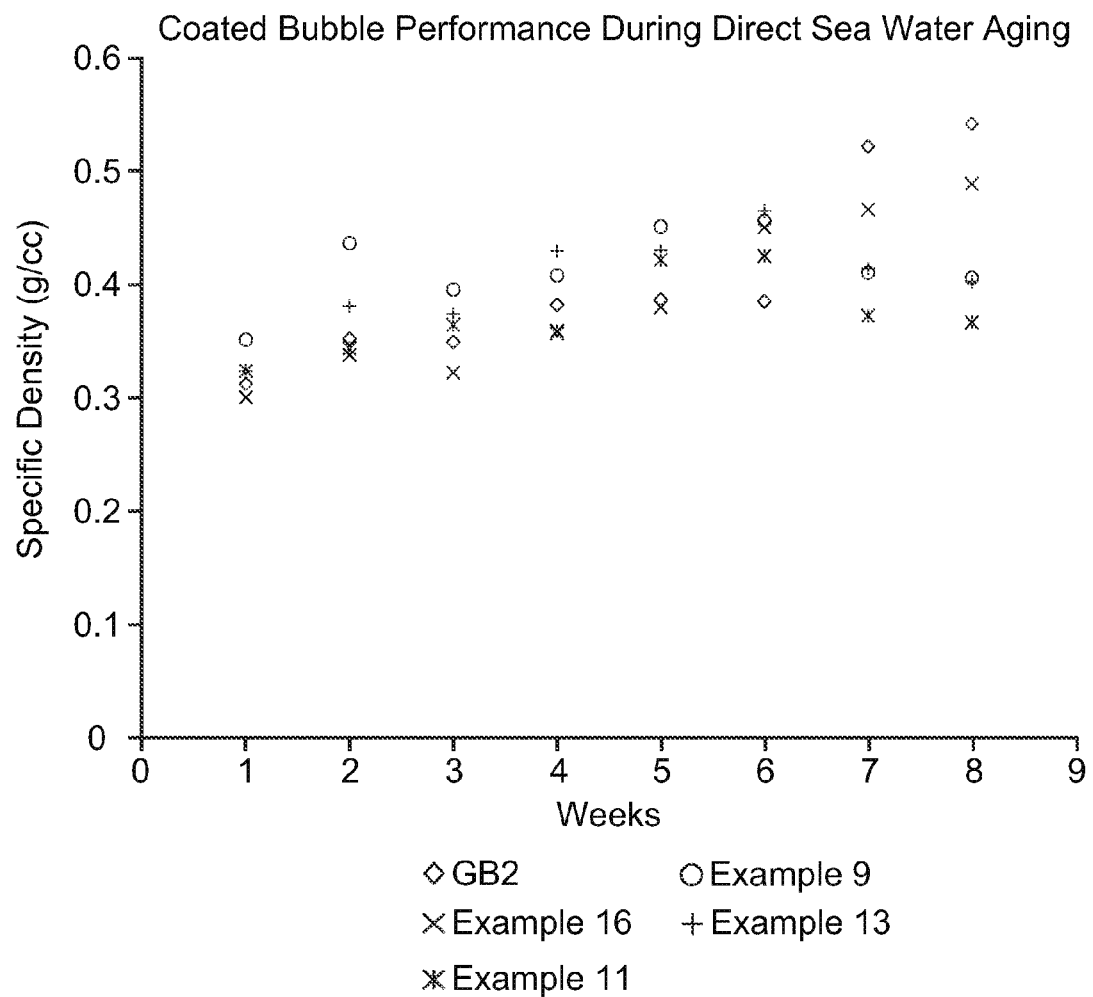
FIG. 13 is a plot of density (specific gravity in $g/cm^3$) of the coated (or uncoated) glass bubbles versus weeks elapsed during the simulated subsea aging test of Example 20.

FIG. 13 reports the density (specific gravity in g/cm$^3$) of the coated (or uncoated) glass bubbles as a function of weeks elapsed during the above seawater aging test.

All patents and publications referred to herein are hereby incorporated by reference in their entirety. All examples given herein are to be considered non-limiting unless otherwise indicated. Various modifications and alterations of this disclosure may be made by those skilled in the art without departing from the scope and spirit of this disclosure, and it should be understood that this disclosure is not to be unduly limited to the illustrative embodiments set forth herein.

What is claimed is:

1. A composite particle comprising:
   a single spheroidal core comprising at least one inorganic oxide, and
   a polymeric layer disposed on and confining the spheroidal core, wherein the polymeric layer comprises a conductive cationic polymer and an anionic polymer, and wherein the polymeric layer comprises PEDOT/PSS.

2. A plurality of the composite particles of claim 1, wherein the plurality of composite particles is free-flowing.

3. A method comprising combining the plurality of the composite particles of claim 2 and a binder material.

4. The method of claim 3, wherein the composite particles are substantially uniformly dispersed in the binder material.

5. The method of claim 3, wherein the binder material comprises molten polymer.

6. A composite material comprising a plurality of composite particles of claim 1 dispersed in a binder material.

7. A pipe comprising a tubular metallic member having a corrosion-resistant layer disposed on an outer surface thereof, the corrosion-resistant layer comprising the composite material of claim 6.

8. The composite material of claim 6, wherein the composite material is a pressure-sensitive adhesive.

9. The composite material of claim 6, wherein the binder material comprises a curable material.

10. A method of making composite particles, the method comprising:
   providing a dispersion comprising a continuous aqueous phase and a dispersed phase comprising a conductive cationic polymer and an anionic polymer;
   combining the dispersion with a plurality of spheroidal cores comprising at least one inorganic oxide such that respective polymeric layers are disposed on and confine each of at least a portion of the spheroidal cores to form the composite particles, wherein the respective polymeric layers comprise PEDOT/PSS, and wherein each one of the composite particles contains a single spheroidal core; and
   separating the composite particles from the continuous aqueous phase.

11. The method of claim 10, further comprising adding solvent to at least a portion of the dispersed phase.

12. Composite particles prepared according to the method of claim 10.

* * * * *